US008391597B2

(12) United States Patent
Matsuhira

(10) Patent No.: US 8,391,597 B2

(45) Date of Patent: Mar. 5, 2013

(54) IMAGE CAPTURING APPARATUS, METHOD FOR CAPTURING IMAGE, AND PROGRAM

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 12/566,602

(22) Filed: Sep. 24, 2009

(65) Prior Publication Data

US 2010/0086217 A1 Apr. 8, 2010

(30) Foreign Application Priority Data

Oct. 2, 2008 (JP) ................................ 2008-257087
Mar. 26, 2009 (JP) ................................ 2009-075900

(51) Int. Cl.
*G06K 9/00* (2006.01)

(52) U.S. Cl. .......................... 382/167; 382/274; 358/1.9

(58) Field of Classification Search .................. 382/274, 382/167; 358/1.9
See application file for complete search history.

(56) References Cited

U.S. PATENT DOCUMENTS

2002/0141640 A1* 10/2002 Kraft ............................ 382/167
2005/0141002 A1* 6/2005 Takano et al. .................. 358/1.9
2005/0271295 A1* 12/2005 Tabata et al. .................. 382/274
2007/0195171 A1* 8/2007 Xiao et al. ............... 348/207.99

FOREIGN PATENT DOCUMENTS

JP 07-020524 A 1/1995

* cited by examiner

*Primary Examiner* — Hadi Akhavannik

(74) *Attorney, Agent, or Firm* — Kilpatrick Townsend & Stockton LLP

(57) ABSTRACT

An image capturing apparatus includes an imaging device, a face region specifying unit that specifies a face region including an image of at least a part of a face in an image obtained by using the imaging device, a face region brightness computing unit that computes a brightness level of the face region, a background region brightness computing unit that computes a brightness level of a background region including at least a part of the image excluding the face region, and an image capturing control unit that determines an image capturing configuration in accordance with the brightness levels of the face region and the background region and performs an image capturing process in accordance with the determined image capturing configuration.

15 Claims, 13 Drawing Sheets

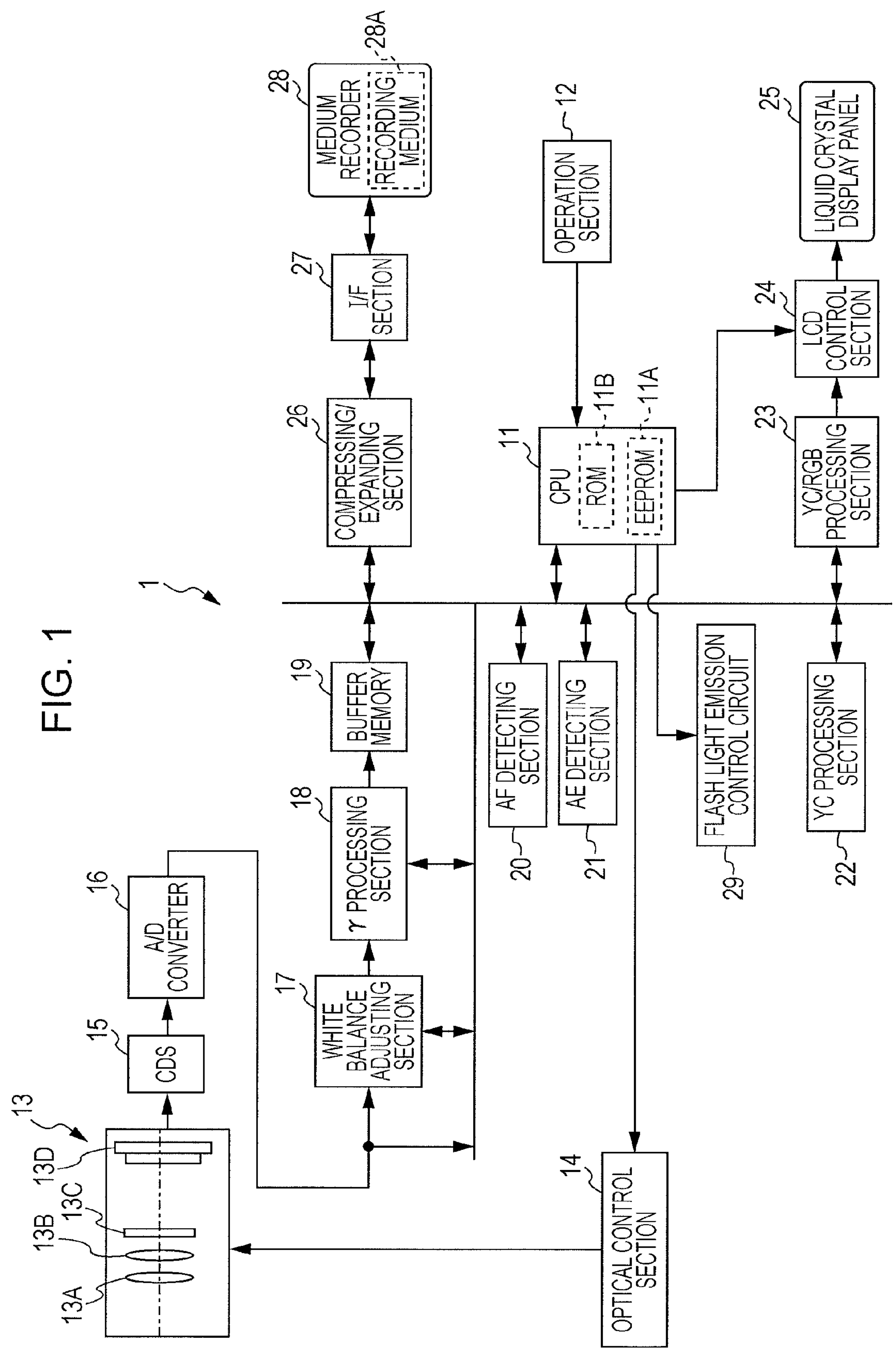
FIG. 1
1
13
13A
13B
13C
13D
15
CDS
16
A/D CONVERTER
17
WHITE BALANCE ADJUSTING SECTION
18
γ PROCESSING SECTION
19
BUFFER MEMORY
26
COMPRESSING/ EXPANDING SECTION
27
I/F SECTION
28
MEDIUM RECORDER
RECORDING MEDIUM
28A
12
OPERATION SECTION
11
CPU
ROM
11B
EEPROM
11A
25
LIQUID CRYSTAL DISPLAY PANEL
24
LCD CONTROL SECTION
23
YC/RGB PROCESSING SECTION
AF DETECTING SECTION
20
AE DETECTING SECTION
21
FLASH LIGHT EMISSION CONTROL CIRCUIT
29
YC PROCESSING SECTION
22
14
OPTICAL CONTROL SECTION

FIG. 11

| | | |
|---|---|---|
| −1 | −1 | −1 |
| −1 | 8 | −1 |
| −1 | −1 | −1 |

IMAGE CAPTURING APPARATUS, METHOD FOR CAPTURING IMAGE, AND PROGRAM

Priority is claimed under 35 U.S.C. §119 to Japanese Application No. 2008-257087 filed on Oct. 2, 2008, and No. 2009-075900 filed on Mar. 26, 2009, which is hereby incorporated by reference in its entirety.

BACKGROUND

1. Technical Field

The present invention relates to an image capturing apparatus, a method for capturing an image, and a program.

2. Related Art

Some of digital cameras capable of capturing an image with flash light have a function of automatic image capturing with flash light for automatically controlling emission of flash light in accordance with a luminance of a target subject. JP-A-07-20524 is an example of the related art.

However, it is sometimes difficult to adequately capture an image of a target object only by automatically controlling the emission of flash light in accordance with the luminance of the target object as in the above function of automatic image capturing with flash light heretofore employed.

SUMMARY

An advantage of some aspects of the present invention is that an image capturing process with flash light is adequately controlled.

An image capturing apparatus according to a first aspect of the invention includes an imaging device, a face region specifying unit that specifies a face region including an image of at least a part of a face in an image obtained by using the imaging device, a face region brightness computing unit that computes a brightness level of the face region, a background region brightness computing unit that computes a brightness level of a background region including at least a part of the image excluding the face region, and an image capturing control unit that determines an image capturing configuration in accordance with the brightness levels of the face region and the background region and performs an image capturing process in accordance with the determined image capturing configuration.

The image capturing control unit preferably performs an image capturing process with emission of light or without emission of light in accordance with the brightness level of at least the face region.

The image capturing control unit preferably decreases a degree of sensitivity or a degree of exposure when a brightness level of a face region is lower than a predetermined brightness level and a brightness level of a background region is higher than a predetermined brightness level, and preferably increases the degree of sensitivity or the degree of exposure when the brightness level of the face region is lower than a predetermined brightness level and the brightness level of the background region is lower than a predetermined brightness level.

The image capturing apparatus according to the first aspect of the invention further includes a correcting unit that corrects a captured image obtained by the image capturing control unit. The correcting unit determines a correcting configuration in accordance with the brightness levels of the face region and the background region.

The correcting unit does not preferably perform a noise removing process when the brightness level of the face region is lower than a predetermined brightness level and the brightness level of the background region is higher than a predetermined brightness level, and preferably perform the noise removing process when the brightness level of the face region is lower than a predetermined brightness level and the brightness level of the background region is lower than a predetermined brightness level.

The face region specifying unit preferably increases a brightness level of an image obtained by using the imaging device by a predetermined quantity and preferably specifies a face region in accordance with the brightened image.

In a case where a plurality of face regions are specified, when a difference between a maximum intensity and a minimum intensity of edges of the plurality of face regions is greater than a predetermined threshold, the face region brightness computing unit preferably computes a brightness level of the face region whose edge intensity is greater than a predetermined edge intensity.

In a case where a plurality of face regions are specified, when a difference between a maximum size and a minimum size of the plurality of face regions is greater than a predetermined threshold, the face region brightness computing unit preferably computes a brightness level of the face region whose size is greater than a predetermined size.

In a case where a plurality of face regions are specified, when a difference between a maximum size and a minimum size of the plurality of face regions is greater than a predetermined threshold and a difference between a maximum intensity and a minimum intensity of edges of the plurality of face regions is greater than a predetermined threshold, the face region brightness computing unit preferably computes a brightness level of the face region whose size is greater than a predetermined size and whose edge intensity is greater than a predetermined edge intensity.

The image capturing apparatus according to the first aspect of the invention further includes a distance computing unit that computes a distance to a target object by using the size of the face region. The image capturing control unit preferably performs an image capturing process with light in a case where the brightness level of the face region is lower than a predetermined brightness level and the distance to the target object is not greater than a distance that the emitted light can reach. The image capturing control unit preferably outputs a message indicating that an image capturing process without emission of light is disabled and preferably performs the image capturing process without emission of light in a case where the brightness level of the face region is lower than a predetermined brightness level and the distance to the target object is greater than the distance that the emitted light can reach.

The image capturing control unit preferably performs the image capturing process without emission of light by increasing a degree of sensitivity for image capturing in a case where the brightness level of the face region is lower than a predetermined brightness level and the distance to the target object is greater than the a distance that the emitted light can reach.

In the case where the plurality of face regions are specified, when a difference between a maximum intensity and a minimum intensity of edges of the plurality of face regions is greater than a predetermined threshold, the face region brightness computing unit preferably computes a brightness level of the face region whose edge intensity is greater than a predetermined edge intensity and the distance computing unit preferably computes the distance to the target object by using the size of the face region whose edge intensity is greater than a predetermined edge intensity.

In the case where the plurality of face regions are specified, when a difference between a maximum size and a minimum size of the plurality of face regions is greater than a predetermined threshold, the face region brightness computing unit preferably computes a brightness level of the face region whose size is greater than a predetermined size and the distance computing unit preferably computes the distance to the target object by using the size of the face region whose size is greater than a predetermined size.

In the case where the plurality of face regions are specified, when a difference between a maximum size and a minimum size of the plurality of face regions is greater than a predetermined threshold and a difference between a maximum intensity and a minimum intensity of edges of the plurality of face regions is greater than a predetermined threshold, the face region brightness computing unit preferably computes a brightness level of the face region whose size is greater than a predetermined size and the distance computing unit preferably computes the distance to the target object by using the size of the face region whose size is greater than a predetermined size and whose edge intensity is greater than a predetermined edge intensity.

An image capturing method according to a second aspect of the invention includes (a) specifying a face region including at least a part of an image of a face in an image captured by using an imaging device, (b) computing a brightness level of the face region, (c) computing a brightness level of a background region including at least a part of an image excluding the face region, (d) determining an image capturing configuration on the basis of the brightness levels of the face region and the background region, and (e) controlling an image capturing process in accordance with the determined image capturing configuration.

A program according to a third aspect of the invention causes a computer to perform an image processing operation. The program includes (a) specifying a face region including at least a part of an image of a face in an image captured by using an imaging device, (b) computing a brightness level of the face region, (c) computing a brightness level of a background region including at least a part of an image excluding the face region, (d) determining an image capturing configuration on the basis of the brightness levels of the face region and the background region, and (e) controlling an image capturing process in accordance with the determined image capturing configuration.

In the image capturing apparatus, the method of capturing an image and the program of some aspects of the invention, a face region including at least a part of an image of a face in an image obtained by the imaging device. A brightness level of the face region is computed. A background region including at least a part of an image excluding the face region is computed. An image capturing configuration is determined in accordance with the brightness levels of the face region and the background region. The image capturing process is performed in accordance with the determined image capturing configuration.

With the above configuration, it is possible to adequately control the image capturing process with emission of flash light.

BRIEF DESCRIPTION OF THE DRAWINGS

The invention will be described with reference to the accompanying drawings, wherein like numbers reference like elements.

FIG. 1 is a block diagram showing a structure of hardware of a digital camera according to an embodiment of the invention.

FIG. 11 is a schematic view showing an example of a Laplacian filter for eight directions.

DESCRIPTION OF EXEMPLARY EMBODIMENTS

Figure 2:
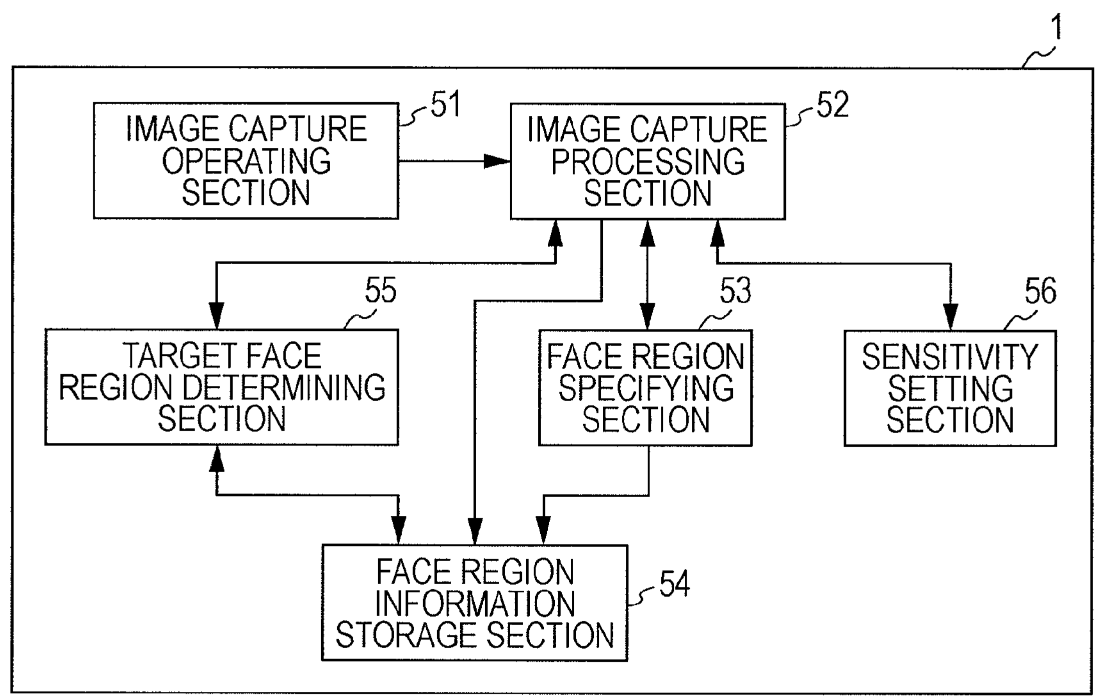
FIG. 2 is block diagram showing a functional structure of the digital camera for performing a flash light control process.

FIG. 1 is a block diagram showing a structure of a digital camera 1 according to a preferred embodiment of the invention.

A CPU (Central Processing Unit) 11 includes an EEPROM (Electronically Erasable and Programmable Read Only Memory) 11A and a ROM (Read Only Memory) 11B. The EEPROM 11A is formed of a rewritable, non-volatile memory. The ROM 11B stores a program. An operation of the digital cameral 1 is controlled by the CPU 11 in accordance with a sequence in the program.

For example, the CPU 11 determines whether or not an automatic flash mode is set. In a case where the automatic flash mode is set, the CPU 11 performs an image capturing process with flash light or an image capturing process without flash light depending on a brightness level of an image of a part of a human's face or a distance to a target object when the target object has the human's face. Hereinafter, a series of the above processes is referred to as a flash light control process Z1.

An operation section 12 accepts operations of operational elements (not shown) such as a shutter button provided at a rear face and a top face of the digital camera 1 and outputs a signal indicative of an operation content to the CPU 11.

An image capturing section 13 is constituted by a zoom lens 13A, a focus lens 13B, an iris 13C and a CCD (Charge Coupled Device) 13D.

Light of a target object incident on the zoom lens 13A is focused on the CCD 13D by being passed through the focus lens 13B and the iris 13C for adjusting the light amount of the light of a target object. In the embodiment, the zoom lens 13A is typically shown as a lens for changing a focal length, and the focus lens 13B is typically shown as a lens for adjusting focus.

An optical control section 14 drives the zoom lens 13A and the focus lens 13B by controlling a motor (not shown) in accordance with an instruction from the CPU 11. The optical control section 14 changes an open diameter of the iris 13C by controlling a motor (not shown) in accordance with an instruction from the CPU 11.

A CDS (Correlated Double Sampling) device 15 performs a process for suppressing noise in an image signal received from the CCD 13D.

An A/D converter 16 converts an analogue signal into a digital RGB signal.

A white balance adjusting section 17 adjusts a balance of a white color of image data by adjusting color components of R, G and B of the RGB signal obtained by conversion of the A/D converter 16. The white balance adjusting section 17 is equipped with an amplifier (not shown) that changes a gain of the image signal from the CCD 13D.

A γ processing section 18 adjusts a gradation characteristic (a so-called γ curve) of an image of a target object. A buffer memory 19 temporarily stores an RGB signal that has been subjected to image processing in the γ processing section 18 after being subjected to image processing in the white balance adjusting section 17.

In response to designation of a distance measurement region by the CPU 11, an AF (Auto Focus) detecting section 20 detects a focus state at the distance measurement region in accordance with an image signal indicative of an image to be captured. A distance to a target object in the distance measurement region is computed in accordance with the detected focus state and a position of the focus lens 13B at that time. In response to designation of a light measurement region by the CPU 11, an AE (Auto Exposure) detecting section 21 detects a luminance of the target object in the light measurement region in accordance with a luminance signal (Y).

A YC processing section 22 converts the RGB signal stored in the buffer memory 19 into a YC signal composed of a luminance signal (Y) and a color signal (C) in order to provide the luminance signal (Y) to the AE detecting section 21.

A YC/RGB processing section 23 converts the YC signal generated by the YC processing section 22 into an RGB signal for display of a live view image. The RGB signal is transmitted to a liquid crystal display panel 25 via an LCD (Liquid Crystal Display) control section 24 that processes the RGB signal at a high speed, and is displayed on the liquid crystal display panel 25 as a live view image.

A compressing/expanding section 26 performs a process for compressing or expanding the image data converted into the YC signal. An interface (I/F) section 27 provides a communication interface so as to enable recording of the compressed image data on a recording medium 28A. A medium recording device 28 physically records the image data onto the recording medium 28A.

A flash light emission control circuit 29 controls LEDs (Light Emitting Diodes) of three colors R (Red), G (Green) and B (Blue) as a flash light source so as to cause the LEDs to emit image-capturing auxiliary light (i.e., flash light) in accordance with an instruction from the CPU 11.

FIG. 2 is a block diagram showing a functional structure of the digital camera 1 for performing the flash light control process Z1. This function is achieved in such a manner that the CPU 11 executes a predetermined program stored in the ROM 11B.

An image capture operating section 51 accepts an operation for capturing an image from a user and sends a signal indicative of the content to an image capture processing section 52.

The image capture processing section 52 controls an entirety of processes for image capturing. For example, the image capture processing section 52 causes an image of a target object to be imaged on the imaging device when receiving information about a full-press manipulation of a shutter button (not shown) from the image capture operating section 51 and performs a process of outputting an RGB signal indicative of a signal of the target object or outputting an RGB signal indicative of a live view image.

The image capture processing section 52 performs the flash light control process Z1 when receiving information about a half-press manipulation of the shutter button. In a case where an input image has an image of a human's face in the flash light control process Z1, when a brightness level of the image of the human's face is lower than a predetermined level and a distance to the target object is not greater than a distance that the flash light can reach, an image capturing process with flash light is performed. When the brightness level of the image of the human's face is lower than a predetermined level and the distance to the target object is greater than the distance that the flash light can reach, information that the image capturing process with flash light is not to be performed, is presented and an image capturing process without flash light is performed.

In response to an instruction from the image capture processing section 52, a face region specifying section 53 specifies a region where at least a part of an image of a face in an image within a captured angle having a human's face is included (hereinafter, referred to as a face region).

A face region information storage section 54 stores face region information about a face region (for example, coordinate data for specifying a position of a face region in terms of a captured angle, a size (a horizontal width, a vertical width), a focal length, or a magnification of a digital zoom) specified by the face region specifying section 53.

A target face region determining section 55 determines a face region (hereinafter, referred to as a target face region) that is used for determination of an on-state or off-state of flash light in the face regions specified by the face region specifying section 53. To be specific, the target face region determining section 55 deletes face region information about a face region which does not satisfy a predetermined condition, from the face region information stored in the face region information storage section 54. Namely, the face region whose face region information eventually remains in the face region information storage section 54 is determined as the target face region.

A sensitivity setting section 56 changes a parameter for an image capturing process under control of the image capture processing section 52.

Figure 3:
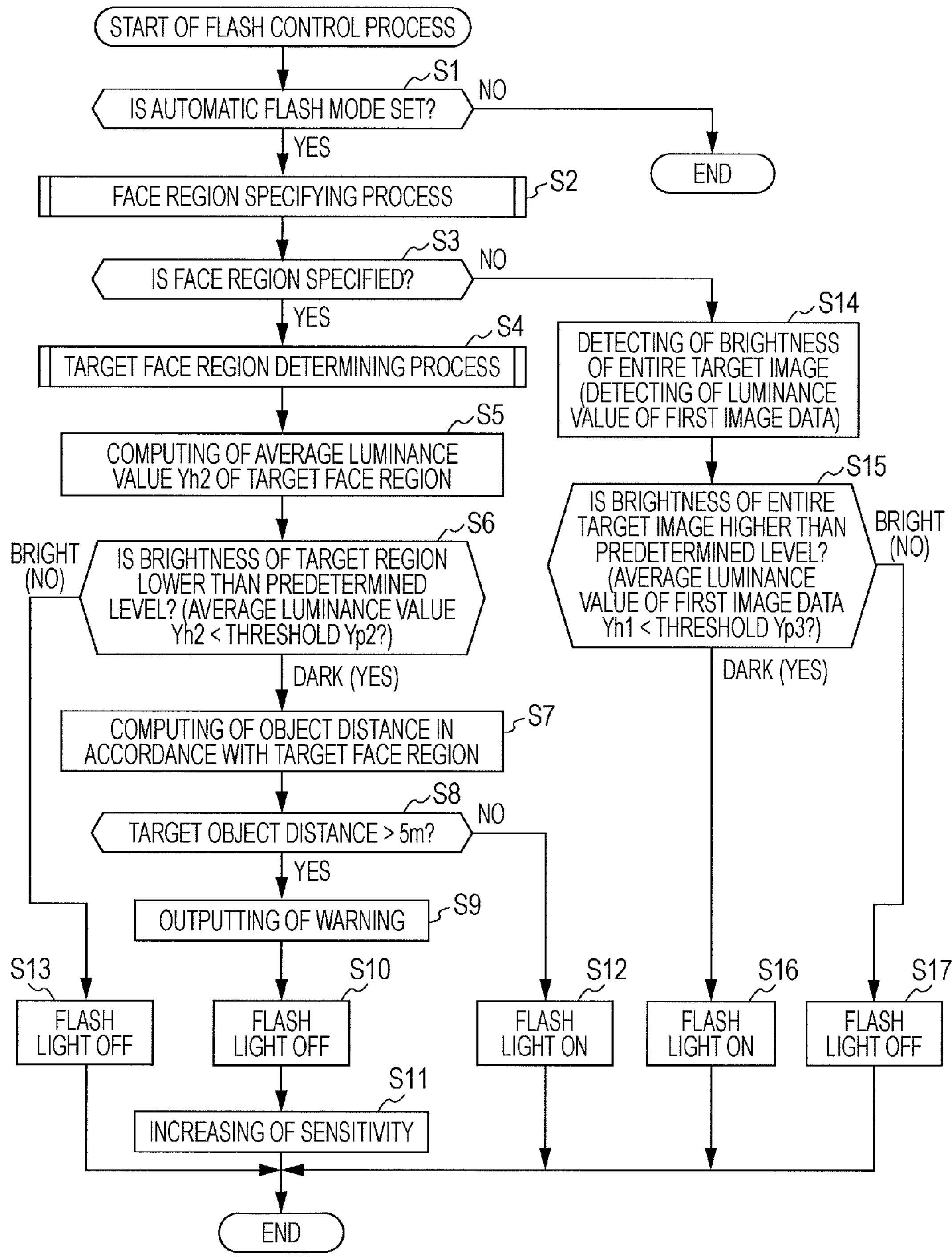
FIG. 3 is a flowchart showing a flow of the flash light control process.

FIG. 3 is a flowchart showing a flow of the flash light control process Z1. The flash light control process Z1 will be described below with reference to the flowchart.

When a user presses a power button (not shown) and power is turned on, the CPU 11 starts execution of a program in the ROM 11B for initialization of the digital camera 1, displays a live view image on the liquid crystal display panel 25, and goes into a state for receiving a setting operation of an image capturing configuration or a manipulation of a shutter button (not shown).

Under the above condition, upon half-pressing the shutter button, the image capture processing section 52 determines whether or not the automatic flash mode is set in step S1.

When it is judged that the automatic flash mode is set, the process is advanced to step S2.

Figure 4:
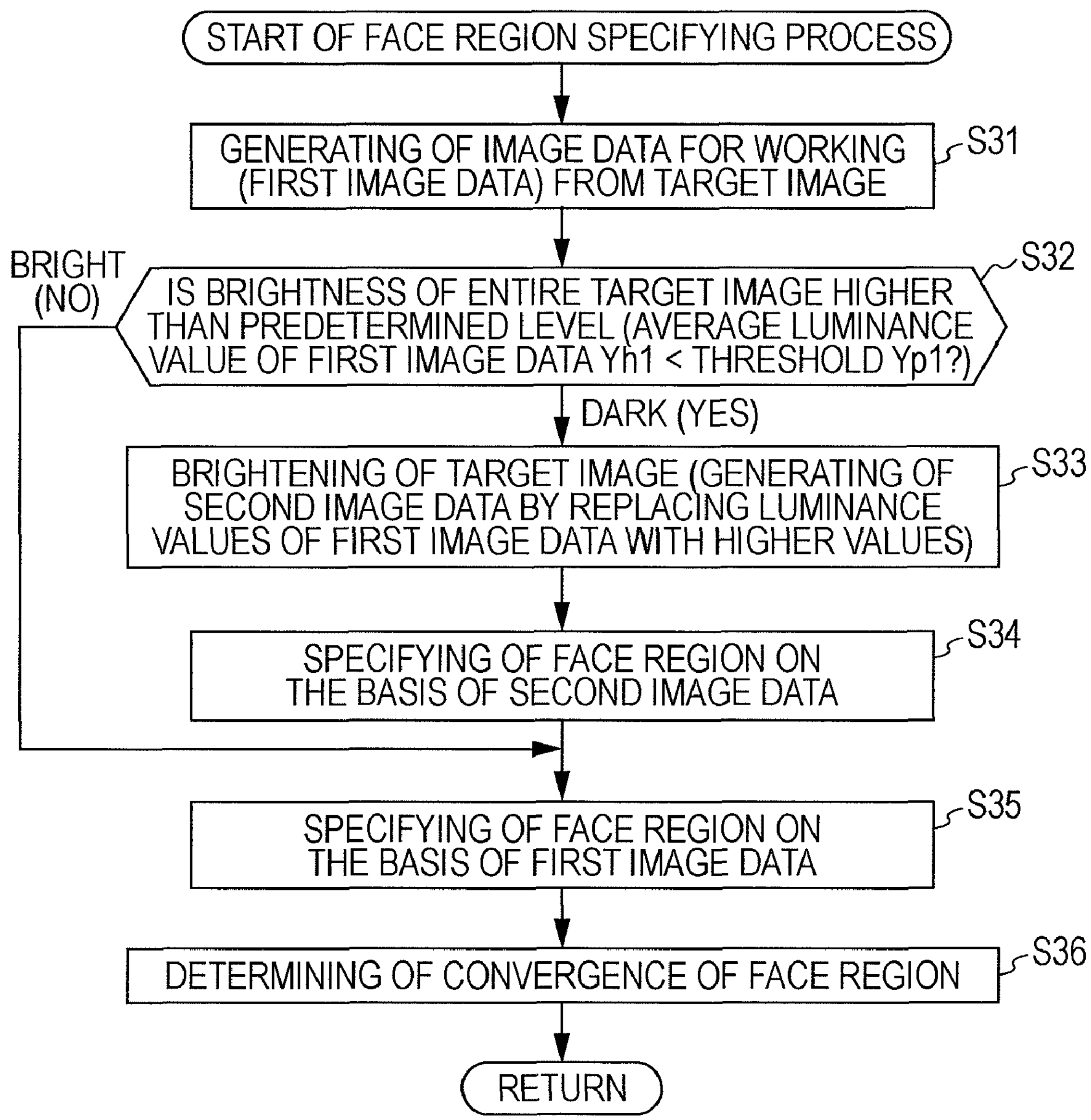
FIG. 4 is a flowchart showing a flow of a face region specifying process in step S2 in FIG. 3.

In step S2, a face region specifying process is performed. FIG. 4 shows a flowchart showing a flow of the face region specifying process. The face region specifying process will be described below with reference to the flowchart.

In step S31, the face region specifying section 53 generates image data for working (hereinafter, referred to as first image data) from an image (hereinafter, referred to as a target image) as a target for specifying the face region, i.e., possibly including a face region. In this embodiment, an entirety of the live view image captured by the image capturing section 13 is made to be the target image and image data before de-mosaicing (namely, before processing such as adjusting of a white balance after processing of A/D conversion) is acquired. The image data before de-mosaicing is allowed to undergo a sampling process so as to generate, for example, an image having dimensions of 320 pixels by 240 pixels as the first image data.

Each one pixel of the image data before de-mosaicing (so-called image data before developing) has only any one of color components of R, G and B. The pixel data having a set of R, G and B is set by de-mosaicing (i.e., developing).

In step S32, the face region specifying section 53 determines whether or not a brightness level of the entirety of the target image is lower than a predetermined level. To be specific, it is determines whether or not an average luminance value Yh1 of all of the pixels of the first image data is smaller than a predetermined value Yp1 (e.g., 70). Note that, the average luminance value Yh1 is computed in accordance with a value of the color component of G forming the first pixel data as shown by a formula (1).

$$Y=0.587\,G \qquad \text{Formula (1)}$$

In step S32, when it is judged that the brightness of the entirety of the target image is lower than a predetermined brightness level (namely, it is judged that the average luminance Yh1 is smaller than the threshold Yp1), the process is advanced to step S33.

In step S33, the face region specifying section 53 increases the brightness of the entirety of the target image. To be specific, the luminance of each pixel of the first image data is replaced with an increased luminance so as to generate second image data.

Figure 5:
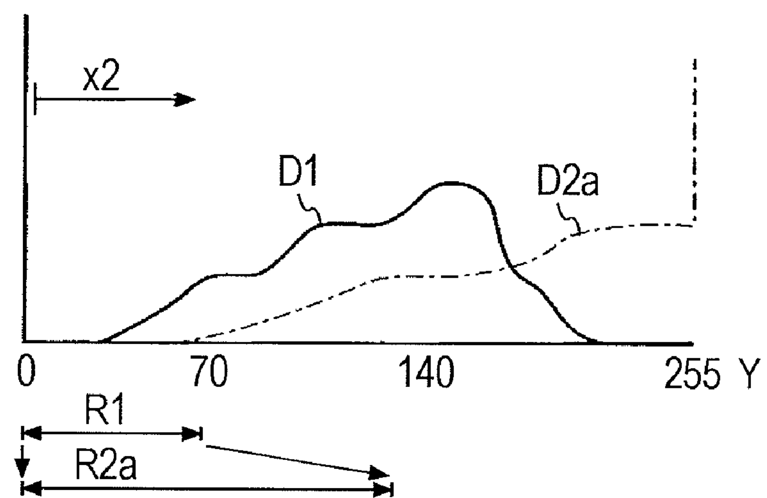
FIG. 5 is a histogram showing a method for generating second image data on the basis of first image data.

FIG. 5 is a histogram showing a method for generating the second image data in accordance with the first image data. FIG. 5 shows a distribution D1 of luminance values of the pixels in the first image data and a distribution D2*a* of luminance values of the pixels in the second image data. In FIG. 5, a horizontal axis designates the luminance in a range of 0 to 255 and a vertical axis designates the number of pixels (frequency) for each luminance value in the image data. Note that, while each of the distributions D1 and D2 presents a scattered appearance, they are indicated by curves for ease of understanding.

In this embodiment, the second image data is generated by replacing the luminance value of each of the pixels of the first image data with a luminance value of twice the above luminance value. As a result, for example, in the first image data, a luminance value Y1 of a pixel within a range R1 of 0 to 70 is converted to a luminance value Y2 ($Y2=Y1\times 2$) of the pixel within a range R2*a* of 0 to 140.

When the luminance value obtained by the two times multiplication exceeds 255, every such value is replaced with 255. Namely, every luminance value of a part represented by the luminance of 126 or more in an image of the first image data is replaced with 255.

Returning to FIG. 4, in step S34, the face region specifying section 53 performs the face region specifying process for specifying the face region in accordance with the second image data.

Here, the face region specifying process will be described below. In the embodiment, by moving a detection window with respect to work image data (here, the second image time), it is determined whether or not a region corresponding to the detection window of the work image data is the face region.

Figure 6:
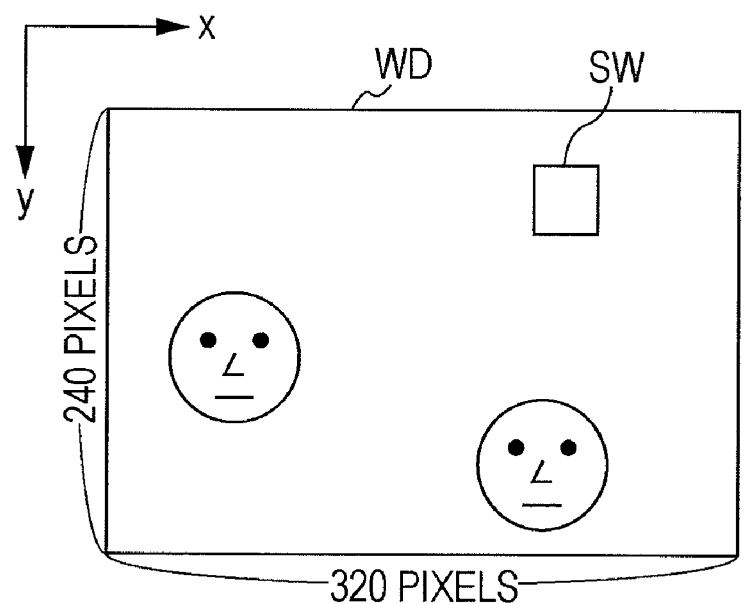
FIG. 6 is a schematic view showing an example of a detection window.

FIG. 6 is a schematic view showing an example of a detection window SW. It is determined whether or not an image region (hereinafter, referred to as an image region IDW) of data fetched by means of the detection window SW is the face region. The determination is confirmed by passing through a plurality of stages.

Figure 7:
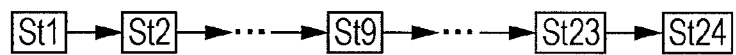
FIG. 7 is a flowchart typically showing a flow of specifying a face region via a plurality of processing stages.

FIG. 7 is a flowchart typically showing a flow for specifying the face region through the plurality of stages. In FIG. 7, the face region is specified by passing through 24 stages St1 to St24.

In each of the stages, the determination is made by using a rectangular filter.

Figure 8:
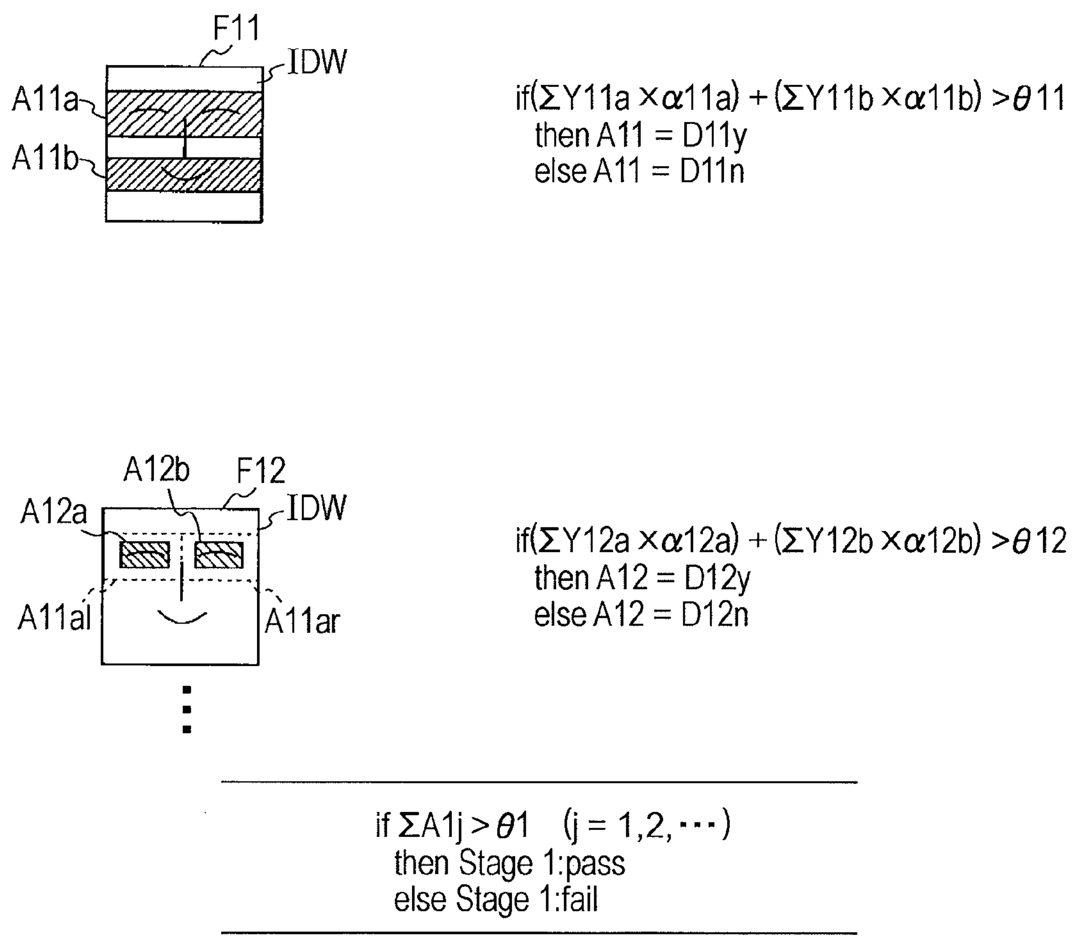
FIG. 8 is a schematic view showing an example of a rectangular filter used in a certain stage in FIG. 7.

FIG. 8 is a schematic view showing examples of rectangular filters F11, F12 (When it is not necessary to discriminate between the filters, each of the filters is referred to as a filter F) to be used in some of the stages. The rectangular filter F is used in order to fetch information about a luminance of a pixel included in a partial region (a region indicated by the shaded area in FIG. 8) of the image region IDW.

Here, the image of the image region IDW to which the rectangular filter F is applied and the rectangular filter F are superposed and indicated in FIG. 8. The image of the image region IDW is the image of a human's face including images of eyes, a nose and a mouth.

The rectangular filter F in the embodiment has dimensions of 20 pixels by 20 pixels. Here, for ease of explanation, the dimensions of the image region IDW of the data fetched by means of the detection window SW are the same as the dimensions of the rectangular filter F. Namely, the image region IDW has the dimensions of 20 pixels by 20 pixels.

The determination method using the rectangular filter F11 will be described below. By using the rectangular filter F11, data Y11*a* of a luminance of each pixel of a region A11*a* in the data of the image region IDW is fetched. The region A11*a* resides on a portion higher than a center in the vertical direction in the image region IDW and has a rectangular shape with a width the same as the width of the image region IDW in the right and left direction. Likewise, data Y11*b* of a luminance of each pixel of a region A11*b* is fetched. The region A11*b* resides on a portion lower than a center in the vertical direction in the image region IDW and has a rectangular shape with a width the same as the width of the image region IDW in the right and left direction.

The region A11*a* is a region in which it is estimated that there are eyes of a human in a case where the image region IDW is the face region. The region A11*b* is a region in which it is estimated that there is a mouth of a human in a case where the image region IDW is the face region.

It is determined whether or not a total value of a value obtained by multiplying $\alpha 11a$ ($\alpha 11a$ is a constant number) to a sum of the luminance values Y11*a* of the pixels in the region A11*a* and a value obtained by multiplying $\alpha 11b$ ($\alpha 11b$ is a constant number) by a sum of the luminance values Y11*b* of the pixels in the region A11*b*, is greater than a predetermined reference value $\theta 11$. When the total value is greater than $\theta 11$, a value D11*y* is returned as a value A11 that is a result of the determination by using the rectangular filter F11. When the total value is equal to or smaller than θ11, a value D11*n* is returned as a value A11 that is a result of the determination by using the rectangular filter F11 (see the right side of the upper part in FIG. 8). Each of the values D11*y* and D11*n* is a predetermined constant number.

Next, a determination method using the rectangular filter F12 will be described below. By using the rectangular filter F12, data Y12*a* of a luminance of each pixel of a region A12*a* in the data of the image region IDW is fetched. The region A12*a* is a part of a region A11*al* that is a left half of the region A11*a* and includes the center of the region A11*al*. Likewise, data Y12*b* of a luminance of each pixel of a region A12*b* in the data of the image region IDW is fetched. The region A12*b* is a part of a region A11*ar* that is a right half of the region A11*a* and includes the center of the region A11*ar*.

The region A12*a* is a region in which it is estimated that there is a right eye of a human when the image region IDW is the face region. The region A12*b* is a region in which it is estimated that there is a left eye of a human when the image region IDW is the face region.

It is determined whether or not a total value of a value obtained by multiplying α12*a* (α12*a* is a constant number) by a sum of the luminance values Y12*a* of the pixels in the region A12*a* and a value obtained by multiplying α12*b* (α12*b* is a constant number) by a sum of the luminance values Y12*b* of the pixels in the region A12*b*, is greater than a predetermined reference value θ12. When the total value is greater than θ12, a value D12*y* is returned as a value A12 that is a result of the determination by using the rectangular filter F12. When the value is equal to or smaller than θ12, a value D12*n* is returned as a value A12 that is a result of the determination by using the rectangular filter F11 (see the right side of the central part in FIG. 8). Each of the values D12*y* and D12*n* is a predetermined constant number.

As described above, the determination using one or more filters F is performed in the process in one stage. It is determined whether or not a total value of the values A11, A12 etc. as the determination results by using each of the filters F is greater than a predetermined reference value Θ1 (see the lower part in FIG. 8). When the total value is greater than the reference value Θ1, it is judged that the image region IDW satisfies a judgment condition of the stage. When the total value is equal to or smaller than the reference value Θ1, it is judged that the image region IDW does not satisfy the judgment condition of the stage. When the image region IDW does not satisfy the judgment condition of the stage, it is judged that the image region IDW is not a face region and the process is finished. On the other hand, when the IDW satisfies the judgment condition of the stage, a determination process of the next stage is performed (see FIG. 7).

Thus, the determination processes of the respective stages are sequentially performed, and it is determined whether or not the image region IDW is a face region on the basis of the determination results of the respective stages.

Meanwhile, the determination described above as to whether or not the image region IDW is a face region is performed in accordance with the luminance values of the respective pixels. The target object is indicated by a luminance difference of each pixel in the image indicated by a luminance of each pixel. Namely, the determination is performed in accordance with the luminance difference between a part of the region of the image (see the regions A11*a*, A11*b*, A12*a* and A12*b* in FIG. 8) and another part of the region of the image. As a result, a region of a face of a human which is imaged entirely in dark is probably not judged to be a face region.

Therefore, in a case where the entirety of the target image is dark (judgment of YES in step S32), the luminance values of pixels of the first image data are respectively replaced with the greater luminance values so as to generate the second image data (step S33). Since, for example, the luminance difference in the second image data is twice the luminance difference in the first image data, the face region can be accurately specified (step S34). For example, the luminance difference value of 10 between a pixel having a luminance value of 20 and a pixel having a luminance value of 30 in the first image data is doubled to be the luminance value of 20 in the second image data after the conversion.

In addition, for example, a luminance difference value of 10 between a pixel having a luminance value of 20 and a pixel having a luminance value of 30 in the first image data, and a luminance difference value of 10 between a pixel having a luminance value of 120 and a pixel having a luminance value of 130 in the first image data are doubled to be the luminance value of 20 in the second image data after the conversion. Namely, equal luminance difference values become equal luminance difference values after the conversion. Therefore, it is possible to accurately specify a face region in the second image data similarly to the case of the first image data.

Meanwhile, in terms of the luminance of a part represented by a luminance value of 126 or more in the image of the first image data, the luminance value is made to be 255 by the above process for doubling the luminance value so that the luminance difference value is possibly made smaller. For this reason, a part that the luminance difference value is eliminated by the process shown in FIG. 4 in the image to be a target is not so large. Further, regarding a part having the luminance value of 126 or more, a face region is specified by a process for specifying a face region (step S35 in FIG. 4) with respect not to the second image data, but to the first image data as described later.

Returning to FIG. 4, in a case where it is judged that the brightness level of the entire target image is higher than a predetermined brightness level (namely, it is judged that an average luminance value Yh1 is not smaller than a threshold Yp1) in step S32, or the face region is specified on the basis of the second image data in step S34, the process is advanced to step S35. In step S35, the face region specifying section 53 performs the process for specifying the face region on the basis of the first image data. To be specific, the face region is specified similarly to the case in step S34.

Next, in step S36, the face region specifying section 53 determines a convergence of face regions in an image P11 represented by the first image data on the basis of the face region specified in step S35, or the face region specified in step S34 and the face region specified in step S35. After that, the face region specifying section 53 causes the face region information storage section 54 to store information (for example, coordinate data for specifying a position of the face region in the captured image angle, a size (a horizontal width, a vertical width), a focal length or a digital zoom magnification) indicative of the face region in the image P11 represented by the determined first image data.

When the convergence of the face regions in the image P11 is determined, about, for example, N (N is an integer not less than 2) number of face regions that share 75% or more pixels, one of the face regions is selected and the remaining face regions are discarded. The face region to be selected is one whose, for example, center is the nearest to a center of a region shared by the N number of face regions. In the embodiment, the face region has a rectangular shape. The center of the rectangular region is positioned at an intersection point of diagonal lines of the rectangular region. The convergence of the face regions constituted by the face regions selected as in the above manner is defined as the convergence of the face regions in the image P11.

As described above, the process for specifying the face region is performed and the process is advanced to step S3 in FIG. 3.

In step S3, the image capture processing section 52 determines whether or not the face region has been specified by the process in step S2. When it is judged that the face region has been specified, the process is advanced to step S4 so that the face region (i.e., the target face region) that is used for controlling flash light (described later) is determined. The process will be described later in detail.

Next, in step S5, the image capture processing section 52 computes an average luminance value Yh2 of the target face region determined in step 4.

In step S6, the image capture processing section 52 determines whether or not the brightness level of the target face region is lower than a predetermined brightness level. To be specific, it is determined whether or not the average luminance value Yh2 of the target face region computed in step S5 is smaller than a limit luminance value Yp2 that does not require compensation for shortage of the light amount of ambient light by emitting flash light.

When it is judged that the brightness level of the target face region is lower than the above predetermined brightness level that does not require compensation for shortage of the light amount of ambient light (i.e., the average luminance value Yh2 is smaller than the threshold Yp2) in step S6, the process is advanced to step S7.

In step S7, the image capture processing section 52 computes a distance from the digital camera 1 to the target object on the basis of the target face region. To be specific, first, an average size C (e.g., an average value of vertical widths) is computed. The target object distance A is computed on the basis of the average size C in accordance with a formula (2).

$$\text{Target object distance } A=(B\times D\times X)/(C\times 24\times 100/2832)\ (m) \qquad \text{Formula (2)}$$

Figure 9:
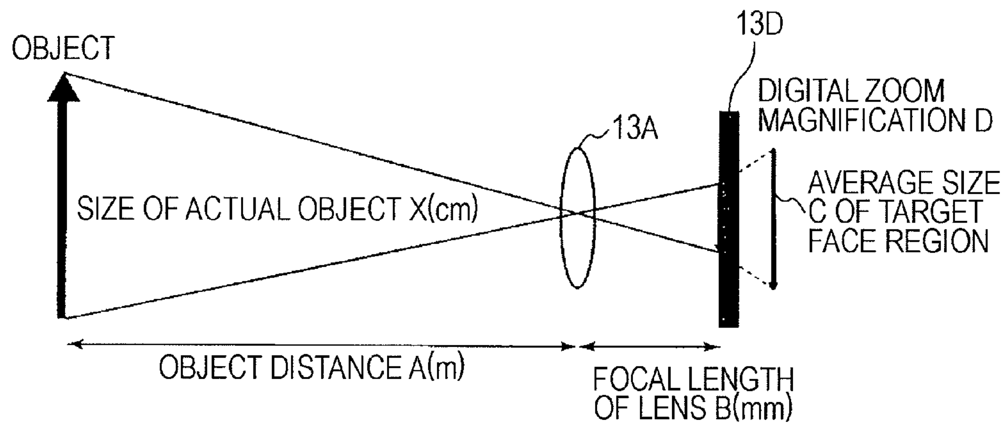
FIG. 9 is an explanatory view showing a coefficient used in computing of a distance to a target object.

FIG. 9 is an explanatory view showing coefficients used in the above operation using the formula (2). The coefficient B represents a lens focal length mm, the coefficient C represents the average size of the target face region as described above, the coefficient D represents a digital zoom magnification and the coefficient X represents a size of an actual human's face. The coefficients B and D are defined by a configuration of the digital camera 1. The coefficient C is, for example, the number of pixels in the vertical direction of the face region. The coefficient X is 20 cm as a typical face size. "2832" is the number of pixels in the vertical direction in the total pixels of 4256×2832, and "24" is the vertical width in a sensor size of 36 mm×24 mm.

Next, in step S8, the image capture processing section 52 determines whether or not the target object distance is greater than a distance that flash light can reach (e.g., 5 m). When it is judged that the target object distance is greater than the distance, the process is advanced to step S9.

In step S9, the image capture processing section 52 causes the liquid crystal display panel 25 to display a warning message indicating that flash light is not to be used, via the LCD control section 24.

Next, in step S10, the image capture processing section 52 instructs the flash light emission control circuit 29 to prohibit the emission of flash light when capturing an image. In step S11, the image capture processing section 52 controls the degree of sensitivity setting section 56 to set a parameter for image capturing so as to increase the sensitivity. For example, a gain of a signal obtained by an image capturing process is increased to be a large value.

With the above configuration, in a case where prohibiting of the emission of flash light in image capturing is instructed and the parameter for image capturing is set so as to increase the degree of sensitivity, when a user carries out a manipulation of full-pressing of the shutter button, the image capturing process without emission of flash light in the high degree of sensitivity is performed.

In step S8, when it is judged that the target object distance is not greater than a distance that the flash light can reach, the image capture processing section 52 instructs the flash light emission control circuit 29 to perform emission of the flash light in the image capturing process in step S12.

As in the above, in a case where the emission of flash light is instructed in an image capturing process, when a user operates the full-press manipulation of the shutter button, the image capturing process with emission of flash light (the image capturing process is synchronized with the emission of flash light) is performed.

In step S6, in a case where it is judged that the brightness level of the target face region is not lower than a brightness level that does not require compensation for shortage of the light amount of ambient light by emission of flash light (namely, it is judged that the average luminance value Yh2 of the target face region is not less than the threshold Yp2), the image capture processing section 52 instructs the flash light emission control circuit 29 to prohibit emission of flash light in an image capturing process. As described above, when prohibition of emission of flash light is instructed in the image capturing process and a user operates full-press manipulation of the shutter button, the image capturing process without emission of flash light is performed.

In a case where it is judged that the face region is not specified in step S3, the image capture processing section 52 determines an turn-on or turn-off state of the flash light in accordance with the brightness level of the entirety of the target image in steps S14 through S17.

Namely, the image capture processing section 52 detects the brightness level of the entirety of the target image in step S14. To be specific, similarly to the case in step S31 in FIG. 4, the image data before de-mosaicing fetched by the image capturing section 13 is acquired, and sampling of the image data is performed so as to generate the first image data. The average luminance value Yh1 of all the pixels of the first image data is detected. Note that, as shown by the formula (1), the average luminance value Yh1 is computed on the basis of the value of the component of G forming the first image data.

Next, in step S15, the image capture processing section 52 determines whether or not the brightness level of the entirety of the target image is lower than a predetermined brightness level. To be specific, it is determined whether or not the average luminance value Yh1 of the first image data computed in step S14 is smaller than a limit luminance value Yp3 for a brightness level that does not require compensation for shortage of the light amount of ambient light by emission of flash light. In the above embodiment, the luminance value Yp3 is the same as the luminance value Yp1 that is used in the determination in step S32 shown in FIG. 4. Namely, in a case where shortage of the light amount of ambient light should be compensated by emission of flash light, the second image data is generated.

In step S15, in a case where it is judged that the brightness level of the entirety of the target image is lower than the brightness level that does not require compensation for shortage of the light amount of ambient light by emission of flash light (namely, it is judged that the average luminance value Yh1 of all the pixels of the first image data is less than the threshold Yp3), the process is advanced to step S16 and the image capture processing section 52 instructs the flash light emission control circuit 29 to perform the emission of flash light in an image capturing process. Thus, in the case where the emission of flash light is instructed in the image capturing process, when a user operates the full-press manipulation of the shutter button, the image capturing process with emission of flash light (the image capturing process is synchronized with the emission of flash light) is performed.

In step S15, in a case where it is judged that the brightness level of the entirety of the target image is not lower than a brightness level that does not require compensation for shortage of the light amount of ambient light by emission of flash light (namely, it is judged that the average luminance value Yh1 of all the pixels of the first image data is not less than the threshold Yp1), the process is advanced to step S17 and the image capture processing section 52 instructs the flash light emission control circuit 29 to prohibit the emission of flash light in an image capturing process. Thus, in the case where prohibition of emission of flash light is instructed in capturing an image, when a user operates full-press manipulation of the shutter button, the image capturing process without emission of flash light is performed.

In the above embodiment, while each of the thresholds Yp2 and Yp3 is the limit luminance value of the brightness level that does not require compensation for shortage of the light amount of ambient light by the emission of flash light, an attention-paid region is different from that of the target image region or the entirety of the target image so that different values or the same value can be given as the values Yp2 and Yp3.

As the above, even in a case where the automatic flash mode is set (judgment of YES in step S1 in FIG. 3), when the face region is dark (judgment of YES in step S6), the flash light can be turned on (step S12). As a result, when, for example, a peripheral portion is bright and a portion of a face is dark, the image capturing process with emission of flash light is performed so that the face can be captured with an adequate exposure.

In a case where a face region is not specified (judgment of NO in step 3), the emission of flash light is on-off controlled on the basis of the brightness level of the entirety of the image (from step S14 to step S17). As a result, even when the face region is not specified, the turn-on or turn-off of the flash light can be adequately controlled.

In addition, as described above, even in a case where the flash light is needed to be turned on (judgment of YES in step S6), when the flash light does not reach the target object (judgment of YES in step S8), the flash light is turned off (step S10). As a result, it is possible to prevent the flash light from being redundantly turned on, thereby, for example, suppressing the power consumption. In addition, since a message indicating that the flash light is turned off is to be presented (step S9), a user can stop capturing of an image or change a capturing configuration in accordance with the presented message so as to cause the user to perform an adequate image capturing operation. In the embodiment, while a message indicative of warning is displayed, it is possible to use blinking of a light or sound of a buzzer. In addition, since the degree of sensitivity is to be increased (step S11), it is possible to capture a comparatively good image even when the flash light is turned off.

In the case where the brightness level of the face region is determined, as the image data before developing is used (step S14 in FIG. 3, step S31 in FIG. 4), it is possible to immediately perform the controlling of the emission of flash light. In the above embodiment, while the luminance value is computed by using the color component of G, it is possible to use, for example, the color component of R. It is also possible to use image data after developing.

In the above case, while the degree of sensitivity is increased by lowering a shutter speed, it is possible to increase the degree of sensitivity by changing any other capturing configuration.

Figure 10:
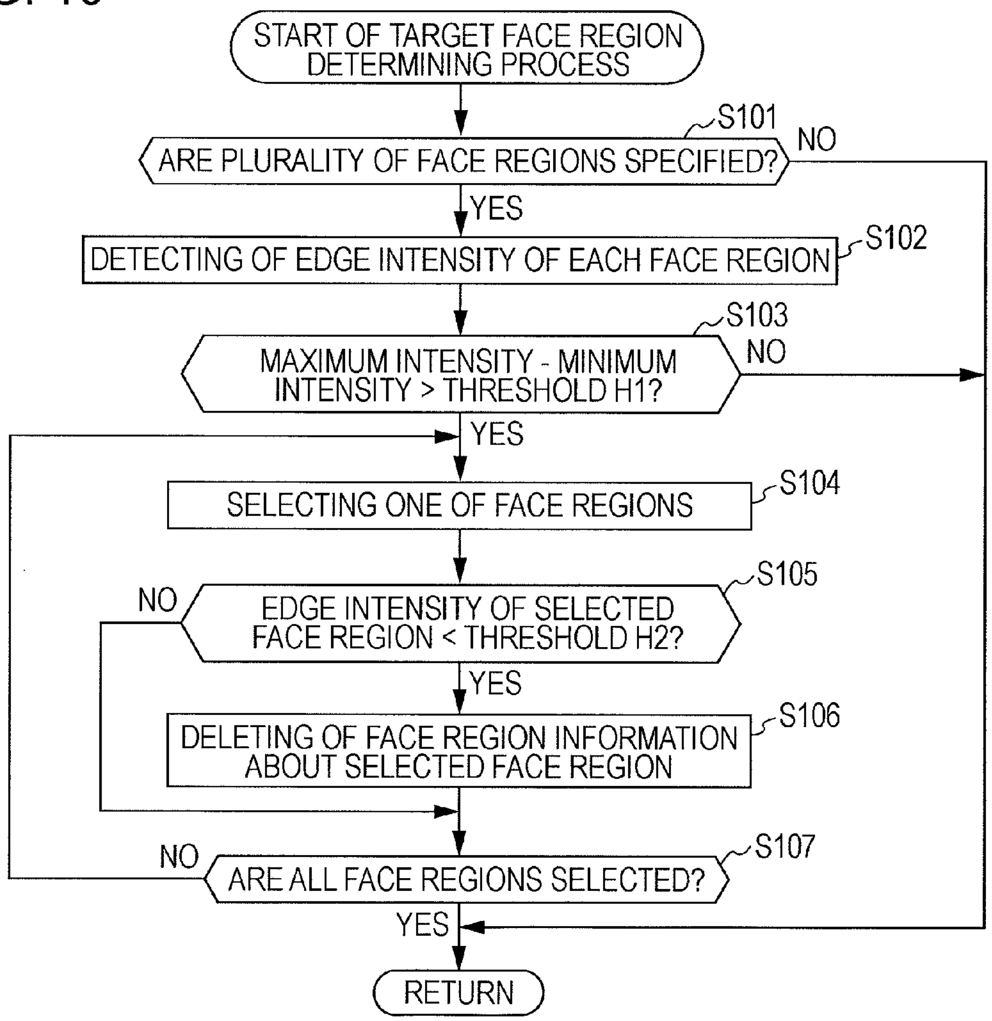
FIG. 10 is a flowchart showing a flow of a target face region determining process in step S4 in FIG. 3.

FIG. 10 is a flowchart showing a flow of the target region determining process shown in FIG. 3. The target face region determining process will be described with reference to the flowchart.

In step S101, the target face region determining section 55 determines whether or not the plurality of face regions are specified. When it is judged that the plurality of face regions are specified, the process is advanced to step S102.

In step S102, the target face region determining section 55 detects an edge intensity of each face region. To be specific, for example, the edge intensity of each face region is detected by using a Laplacian filter.

FIG. 11 is an explanatory view showing an example of the Lalacian filter for eight directions to be used for detecting the edge intensity. In the Laplacian filter, coefficients are arranged in a three by three matrix in such a manner that the coefficient at the center is maximum and the total value of the coefficients is equal to zero. The Laplacian filter is superposed on the face region. The pixels of the face region corresponding to the Laplacian filter and the coefficients are multiplied with each other and the results are summed up. The above operation is performed by moving the Laplacian filter by each one pixel. In the values obtained by the above operation, the maximum value is referred to as the edge intensity of the face region. The above processing is applied to all of the face regions.

In step S103, the target face region determining section 55 determines whether or not a difference between the maximum intensity and the minimum intensity is greater than a predetermined threshold H1 in terms of the edge intensity of each face region detected in step 102. When the target face region determining section 55 judges that it is greater than the threshold H1, the process is advanced to step S104.

In step S104, the target face region determining section 55 selects one face region from the plurality of face regions. In step S105, it determines whether or not an edge intensity of the face region is smaller than a predetermined threshold H2. When the target face region determining section 55 judges that it is smaller than the threshold H2, the target face region determining section 55 deletes the face region information about the face region selected at that time from the face region information storage section 54 in step S 106.

In step S107, the target face region determining section 55 determines whether or not all of the plurality of detected face regions are selected. When it is judged that there remains a face region which has been not yet selected, the process is returned to step S104 and the target face region determining section 55 selects the remaining face region and similarly performs the process in step S105 and the following processes.

When it is judged that the plurality of face regions are not detected in step S101, it is judged that the difference in edge intensity between the maximum intensity and the minimum intensity is not greater than the threshold H1 in step S103, or all of the plurality of face regions are selected in step S107, the process is completed.

Thus, the target region determining process is performed. Namely, since the face region information about the face region not satisfying a predetermined condition is deleted, the face region whose face region information remains without being deleted in the face region information storage section 54, is processed as the target face region in step S5 shown in FIG. 3.

In a case where a face which is originally a target image and a face of, for example, a passer which is not a target image, reside in an captured screen angle, the face as the target image is usually made in focus, but the face as the non-target image is not made in focus. Therefore, in the above case, the image obtained at that time includes the face region having the high edge intensity (the face region including an image of a face to be a capturing target) and the face region having the low edge intensity (the face region including an image of a face not to be a capturing target).

With the above, in a case where there simultaneously exist the face region in focus having the high edge intensity (the face region including a face to be a capturing target) and the face region out of focus having the low edge intensity (the face region including a face not to be a capturing target) (judgment of YES in step S103), the face region out of focus having the low edge intensity (the face region including a face not to be a capturing target) is excluded (in steps S105 and S106) and controlling of the emission of flash light is performed in accordance with the remaining face region having the high edge intensity (the face region including the image of the face to be captured) (i.e., the target face region) in steps S5 through S13 in FIG. 3. Namely, the controlling of the emission of flash light can be performed in accordance with the image of the face as the capturing target.

Note that, in a case where it is judged that the plurality of face regions are not detected in step S101, since only one face region is specified, the one face region is made to be the target face region. In addition, in a case where the difference in the edge intensity between the maximum intensity and the minimum intensity is not greater than the predetermined threshold H1 in step S103, since all of the face regions are possibly in focus to be the capturing targets, all of the plurality of face regions are made to be the target face regions.

Figure 12:
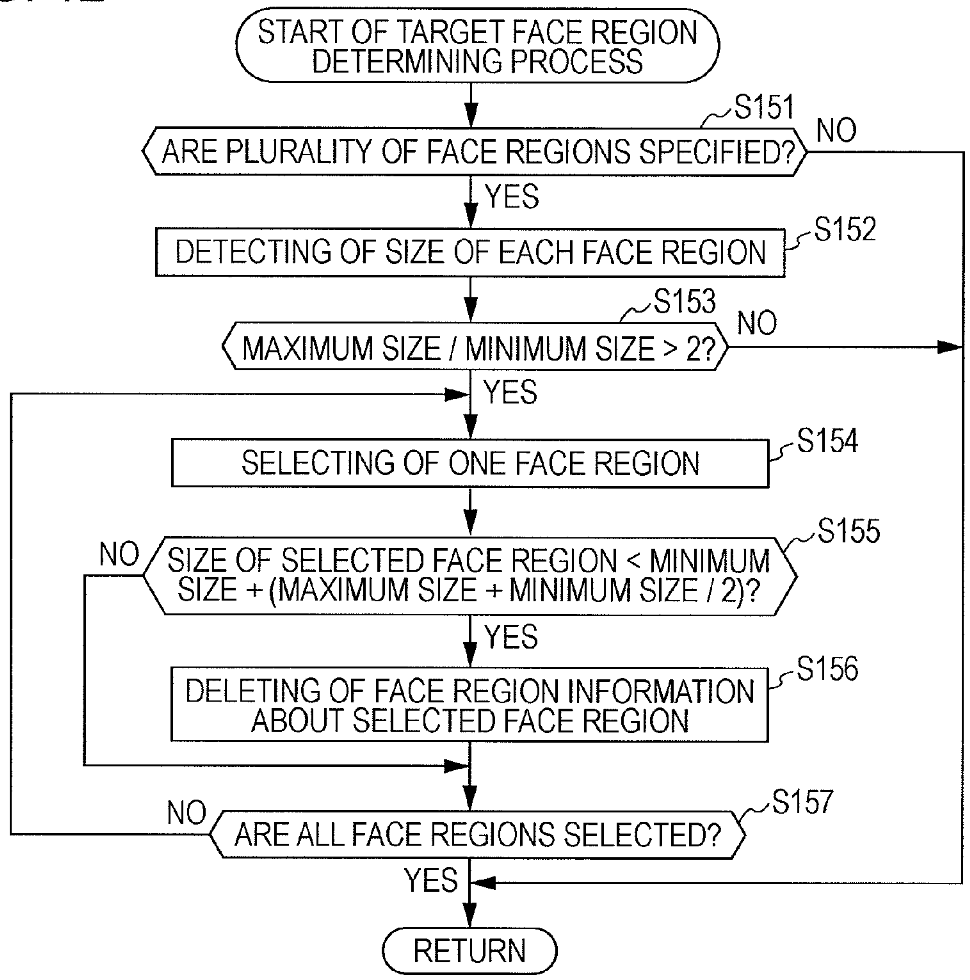
FIG. 12 is a flowchart showing a flow of another target face region determining process in step S4 in FIG. 3.

FIG. 12 is a flow chart showing a flow of another target face region determining process. The target face region determining process will be explained below with reference to the flowchart.

In step S151, the target face region determining section 55 determines whether or not the plurality of face regions are specified. When it is judged that the plurality of face regions are specified, the process is advanced to step S152.

In step S152, the target face region determining section 55 detects a size of each of the face regions. In this embodiment, a vertical width (e.g., the number of pixels) of the face region is defined as the size.

In step S153, the target face region determining section 55 determines whether or not the maximum size in the face regions detected in step S152 is greater than the double of the minimum size in the face regions. When it is judged that it is greater than the double of the minimum size, the process is advanced to step S154.

Figure 13:
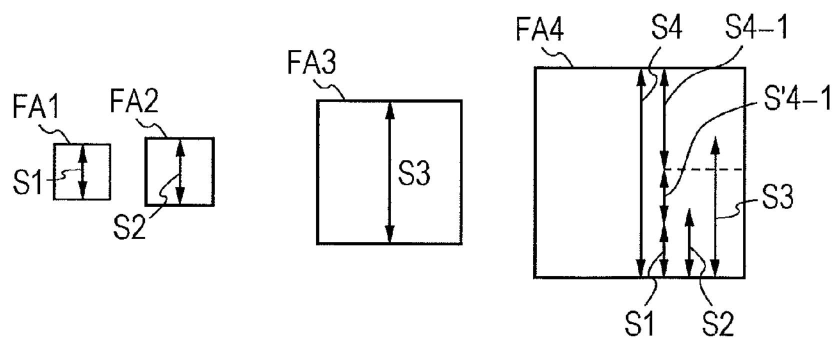
FIG. 13 is an explanatory view typically showing a size of a face region.

FIG. 13 is a schematic view typically showing a size of a face region. In FIG. 13, four face regions FA1 to FA4 having different sizes are arranged in the descending order of the sizes thereof. In this embodiment, it is determined whether or not the vertical width S4 of the face region FA4 as the maximum size is greater than the double of the vertical width S1 of the face region FA1 as the minimum size. Since the vertical width S4 of the face region FA4 as the maximum size is greater than the double of the vertical width S1 as the minimum size, the process is advanced to step S154.

In step S154, the target face region determining section 55 selects one face region out of the plurality of face regions.

In step S155, the target face region determining section 55 determines whether or not the size of the face region presently selected is smaller than a value of a result (of a formula (3)) obtained by adding the half of the difference between the maximum size and the minimum size of the face regions to the minimum size. When it is judged that it is true, the target face region determining section 55 deletes the face region information about the presently selected face region from the face region information storage section 54 in step S156.

$$\text{size of face region} < \text{minimum size} + (\text{maximum size} - \text{minimum size})/2 \qquad \text{Formula (3)}$$

In the embodiment shown in FIG. 13, assuming that the face region FA2 is selected at present, since the size S2 of the face region FA2 is smaller than the value (the height of a dotted line in FIG. 13) obtained by adding a half (S'4-1) of a difference (S4-1) between the maximum size (S4) and the minimum size (S1) to the minimum size (S1), the face region information of the face region FA2 is deleted from the face region information storage section 54.

Next, in step S157, the target face region determining section 55 determines whether or not all of the detected plurality of face regions are selected. When it is judged that there still remains the face region that is not selected, the process is returned to step S154 and the target face region determining section 55 selects the remaining face region and performs the process in step S155 and the following processes.

When it is judged that the plurality of face regions are not detected in step S151, the maximum size of the face region is not greater than a double of the minimum size in step S153, or all of the plurality of face regions are selected in step S157, the process is finished.

Thus, the target region determining process is performed. In the above embodiment, since the face region information of the face region not satisfying a predetermined condition is deleted, the face region whose face region information remains in the face region information storage section 54 without being deleted is processed as the target face region in step S5 in FIG. 3.

In a case where a face which is originally a capturing target and a face of, for example a passer which is not a capturing target reside in a captured screen angle, since a face of a capturing target is often close up, there exist a large face region (the face region including an image of the face as the capturing target) and a small face region (the face region including an image of the face not to be a capturing target) in the image obtained at that time.

In a case where there exist the large face region (the face region including an image of the face as the capturing target) and the small face region (the face region including an image of the face not to be a capturing target) (judgment of YES in step S153), the small face region is removed and the controlling of the emission of flash light is performed (in steps S5 through S13 in FIG. 3) on the basis of the remaining large face region (i.e., the target face region) (steps S156 and S157). Namely, the controlling of the emission of flash light can be performed on the basis of the image of the face as the capturing target.

In the embodiment shown in FIG. 13, two face regions FA3 and FA4 in the four face regions FA1 through FA4 are made to be the target face regions, and the controlling of the emission of flash light is performed on the basis of the target face regions.

When it is judged that the plurality of face regions are not detected in step S151, since only one face region is specified, the one face region is made to be the target face region. When it is judged that the maximum size is not greater than the double of the minimum size in step S153, a user possibly tends to capture all of the faces in the same level and to make them to be the capturing targets so that all of the face regions are made to be the target face regions.

As described with reference to FIGS. 10 and 12, in a case where a face to be the capturing target and the face not to be the capturing target are possibly involved in the captured image, the controlling of the emission of flash light is performed on the basis of the face region including the image which is possibly the face to be the capturing target so that the effective controlling of the emission of flash light can be performed. For example, since the face region including the image of the face not to be the target image is excluded, it is possible to perform determination of a turn-on or turn off state of the flash light (step S6 in FIG. 3) or determination of whether or not the flash light can reach the capturing target (step S8) without being affected by such a face region not to be the target image.

In the above, the target face region determining process is described with reference to the exemplary embodiment that either one of the method by using the edge intensity (FIG. 10) and the method by using the size (FIG. 12) is performed. However, it is possible to combine the above methods.

Figure 14:
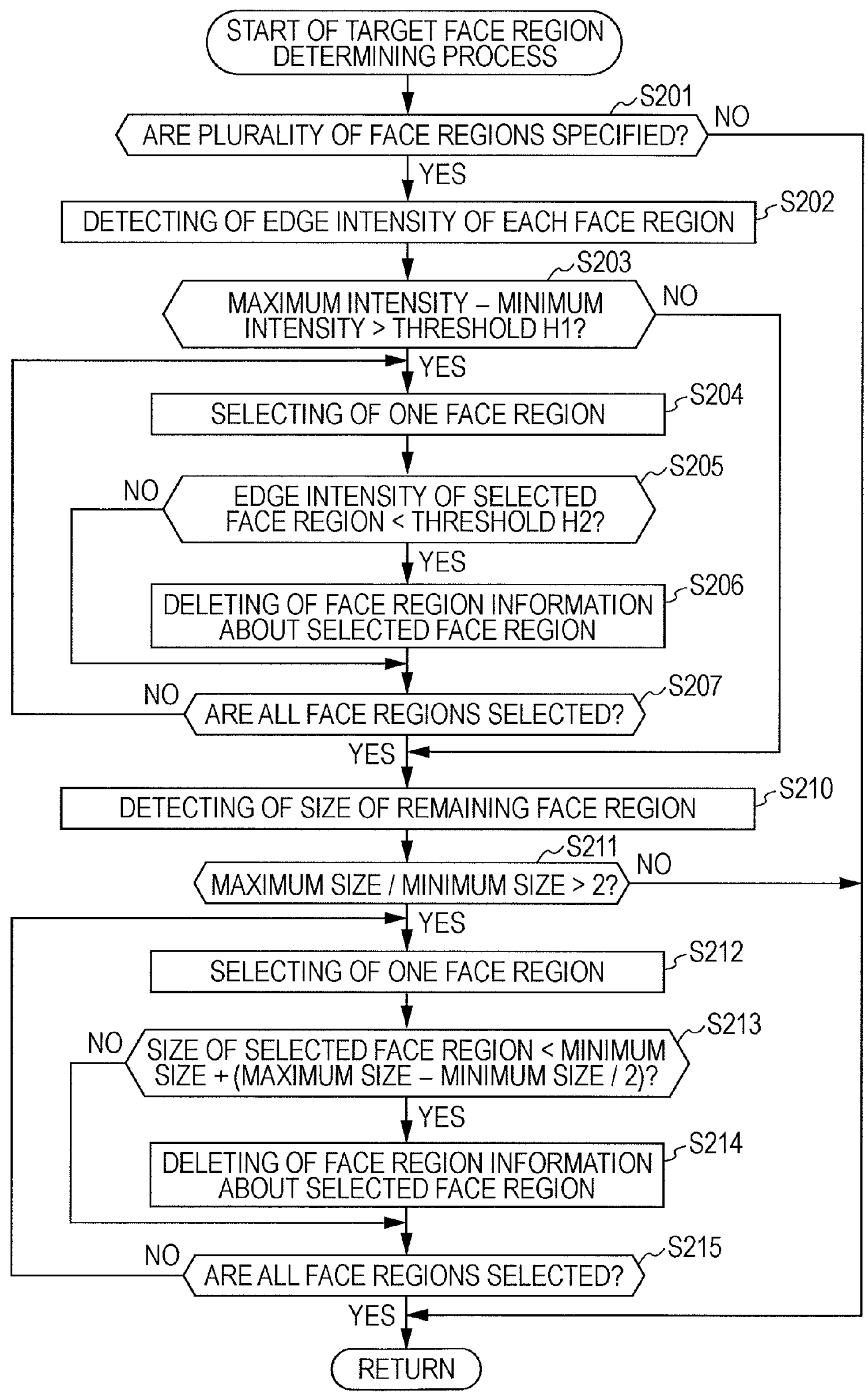
FIG. 14 is a flowchart showing a flow of another target face region determining process in step S4 in FIG. 3.

FIG. 14 is a flowchart showing a flow of the target face region determining process in a case where after the face region is selected by the method by using the edge intensity, the face region is further selected by the method by using the size so as to determine the target face region.

Basically, the process described in FIG. 10 is performed. After that, the process described in FIG. 12 is performed (the details are omitted). As a result, the target face region determining process by using the size is applied to the face region that remains in the target face region determining process by using the edge intensity in the embodiment.

Figure 15:
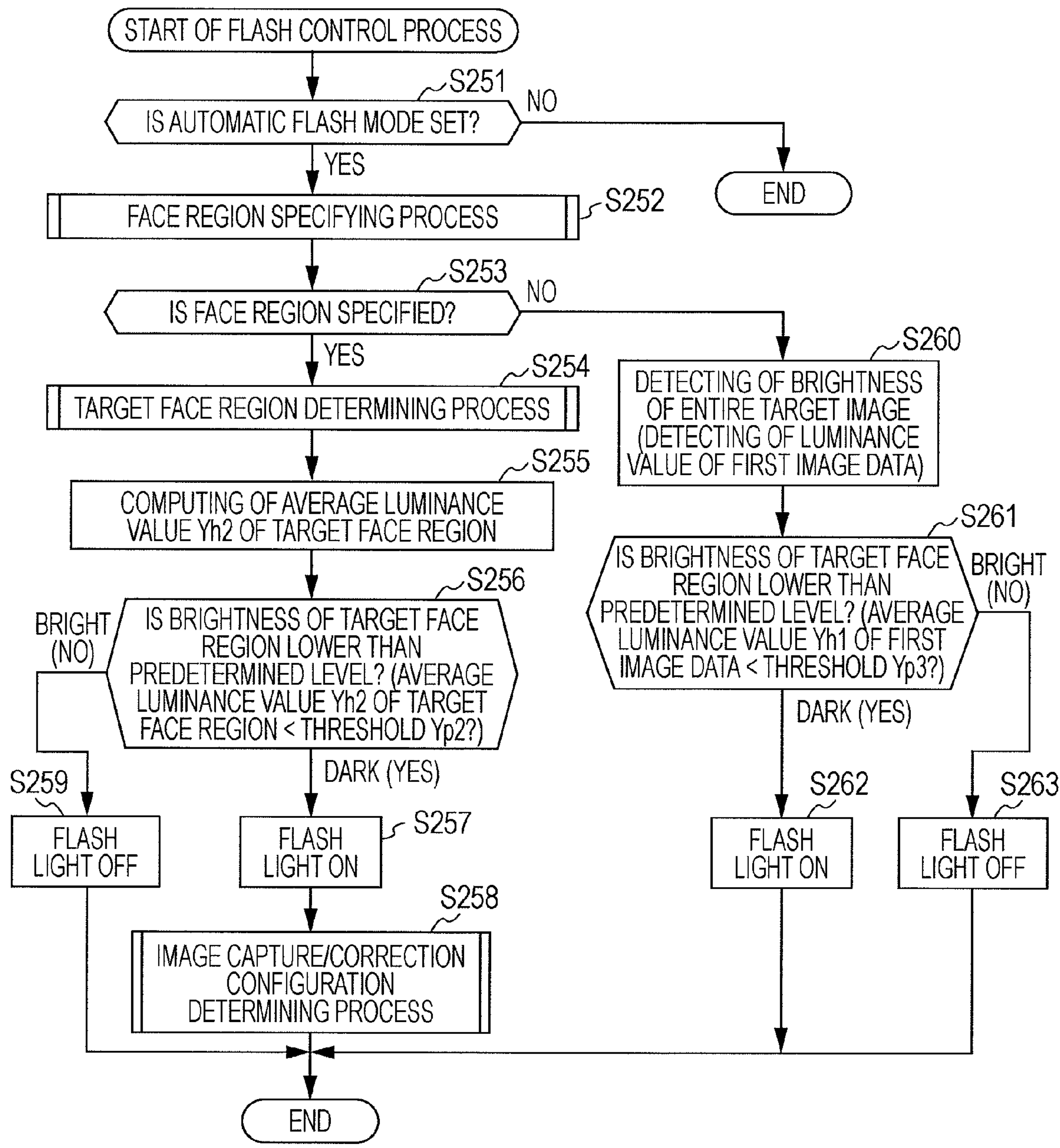
FIG. 15 is a flowchart showing a flow of another flash light control process.

FIG. 15 is a flowchart showing a flow of another flash light control process Z1. In the flash light control process Z1, when the brightness level of the target face region is lower than a predetermined level (step S256), the flash light is turned on (step S257). Under this condition, the capturing configuration is changed in accordance with the brightness level of the background.

In steps S251 through S256, processes similar to the processes in steps S1 through S6 shown in FIG. 3 are performed. In steps S259 through S263, processes similar to the processes in step S13 through S17 shown in FIG. 3 are performed. Therefore, the descriptions thereof are omitted.

When it is judged that the brightness level of the target face region is lower than a predetermined level in step S256, the image capture processing section 52 instructs the flash light emission control circuit 29 to perform emission of the flash light in the image capturing process. Thus, in a case where the emission of flash light is instructed in the image capturing process, when a user operates the full-press manipulation of the shutter button, the image capturing process with emission of flash light (the capturing of an image is synchronized with the emission of flash light) is performed.

Figure 16:
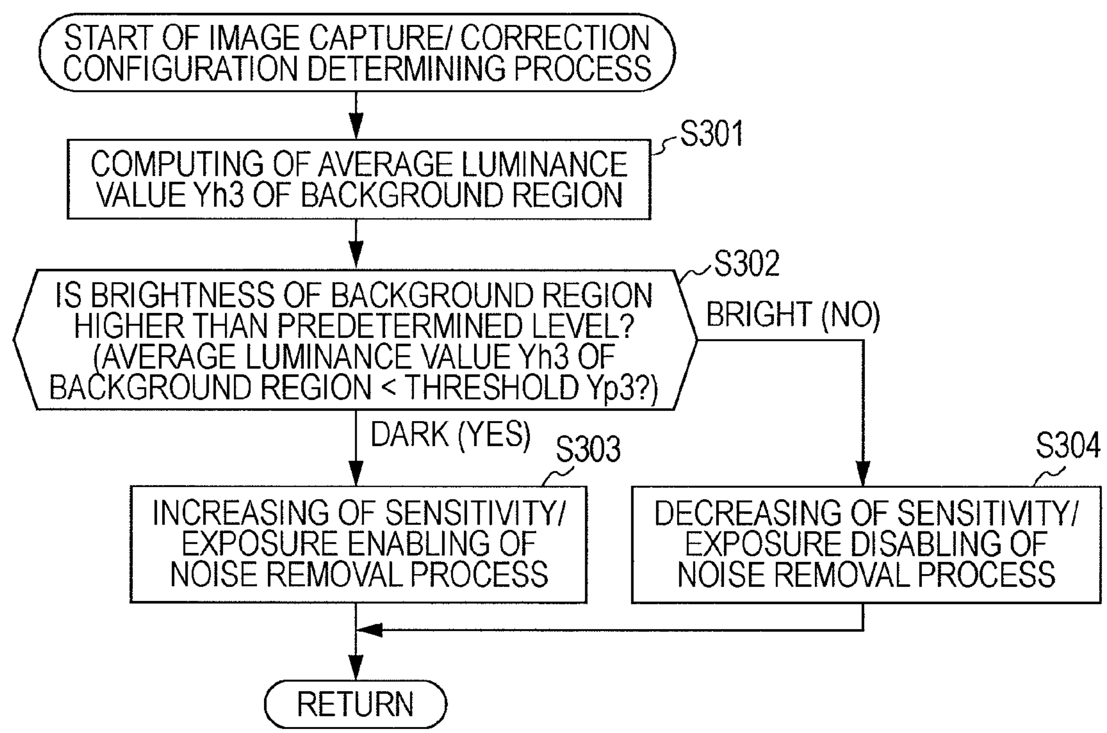
FIG. 16 is a flowchart showing a flow of an image capturing/correcting configuration determining process (in step S258 in FIG. 15).

In step S258, an image capturing/correcting configuration determining process is performed. FIG. 16 is a flowchart showing a flow of the image capturing/correcting configuration determining process. Here, the image capturing/correcting configuration determining process will be described with reference to the flowchart.

In step S301, the image capture processing section 52 computes an average luminance value Yh3 of a region (hereinafter, referred to as a background region) excluding a target face region in the target image, the target face region being determined in step S254.

In step S302, the image capture processing section 52 determines whether or not the brightness level of the background region is lower than a predetermined brightness. To be specific, it is determined whether or not the average luminance value Yh3 of the background region computed in step S301 is smaller than a limit luminance value Yp3 of the brightness level that does not require compensation for shortage of the light amount of ambient light by emission of flash light.

When it is judged that the brightness level of the background region is lower than a predetermined level in step S302, the image capture processing section 52 controls the sensitivity setting section 56 to allow it to set a parameter in the image capturing process so as to increase the degrees of sensitivity and exposure. For example, the magnification is increased, or an aperture or a shutter speed is adjusted. The image capture processing section 52 controls an image processing section (not shown) to allow it to activate a noise removing process. As in the above, by activating the noise removing process, a filtering process for removing noise is, for example, applied to an image obtained by the image capturing process.

In step S302, when it is judged that the brightness level of the background region is not lower than a predetermined level (i.e., brighter), the image capture processing section 52 controls the sensitivity setting section 56 to allow it to set the parameter in the image capturing process so as to decrease the degrees of sensitivity and exposure. At that time, the noise removing process is inactivated.

When the parameter is changed in step S303 or S304, the flash light control process Z1 in FIG. 15 is finished.

Thus, in a case where the target face region is dark and the background region is also dark (e.g., in the night), the capturing configuration is set so as to increase the degrees of sensitivity and exposure and to enable the image capturing process with flash light so that it is possible to capture a clear image including, for example, a background that the flash light does not sufficiently reach. As the degree of sensitivity is increased, noise tends to occur. However, the noise removing process is activated so that it is possible to remove the noise.

In addition, in a case where the target face region is dark and the background region is bright (e.g., in a case of image capturing against light), since the degrees of sensitivity and exposure are decreased and the image capturing process with flash light can be performed, it is possible to prevent, for example, a color in the background from being reduced.

Figure 17:
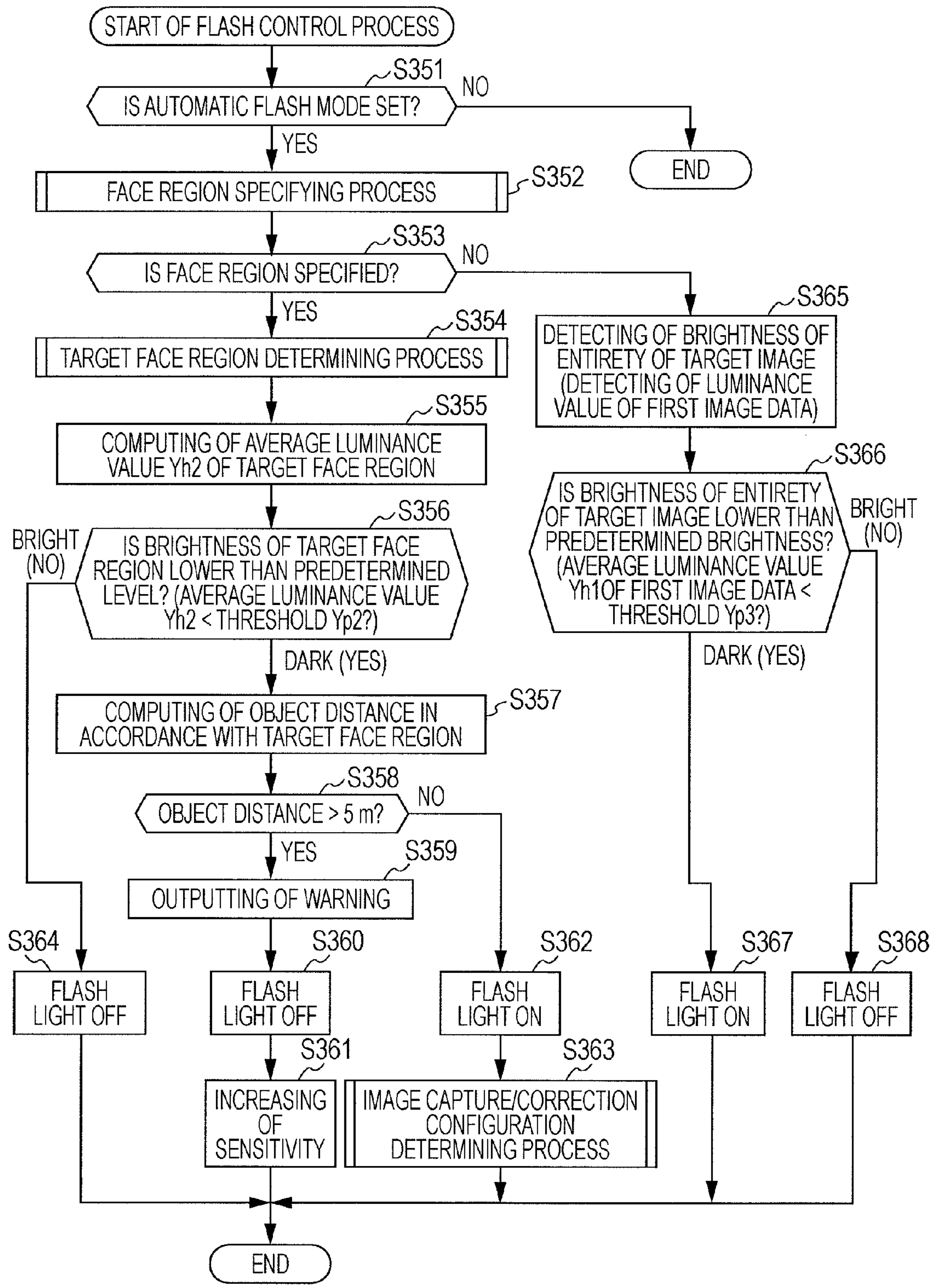
FIG. 17 is a flowchart showing a flow of another flash light control process.

Meanwhile, in the embodiment shown in FIG. 15, under the condition that the brightness level of the target face region is lower than a predetermined level, the flash light is to be turned on. However, even when the brightness level of the target face region is lower than the predetermined level as in the embodiment shown in FIG. 3, it is possible to control the turn-on or turn-off of the flash light in accordance with the target object distance. Namely, it is possible to combine the flash light control processes Z1 respectively shown in FIG. 3 and FIG. 15. FIG. 17 is a flowchart showing flow of a flash light control process Z1 in which the flash light control processes Z1 respectively shown in FIG. 3 and FIG. 15 are combined.

In steps S351 through S362, processes similar to the processes in steps S1 through S12 in FIG. 3 are performed. In steps S364 through S368, processes similar to the processes in steps S13 through S17 in FIG. 3 are performed. Therefore, the descriptions thereof are omitted.

In the above flash light control process Z1, it is judged that the target object distance is not greater than a distance that the flash light can reach (e.g., 5 m) in step S358 and the emission of flash light in the image capturing process is instructed to the flash light emission control circuit 29 in step S362. After that, the image capturing/correcting configuration determining process (in FIG. 16) is performed.

Note that, about the processes described in the flowchart, the steps can be sequentially processed in the described order in a time-series manner. However, the steps are not necessarily processed in a time-series manner, but can be concurrently or independently processed. For example, the process in step S254 in FIG. 15 or the process in step S354 in FIG. 17 can be omitted in convenience. Namely, the specified face region can be made to be the target face region as it is.

A program including contents of the processes of the above described functions is provided. The program including the contents of the processes can be recorded in a computer readable recording medium. As the computer readable recording medium, a magnetic recorder, an optical disc, a magneto-optical recording medium and a semiconductor memory can be given. As the magnetic recorder, a hard disc device (HDD), a flexible disk (FD) and a magnetic tape can be given. As the optical disk, a DVD (Digital Versatile Disc), a DVD-RAM, a CD-ROM (Compatible Disc ROM), a CD-R (Recordable)/RW (ReWritable) can be given. As the magneto-optical recording medium, an MO (Magneto-Optical disc) can be given.

When distributing the program, a portable recording medium such as, for example, a DVD or CD-ROM containing the program recorded therein is on sale. In addition, the program may be stored in a storage device of a server computer and the program can be transferred to any other computers via a network.

The computer for executing the program stores the program in its storage device, the program being, for example, recorded in a mobile type recording medium or transferred from the server computer. The computer reads the program from its storage device and executes the processes in accordance with the program. Note that, the computer can directly reads the program from the mobile type recording medium and executes the processes in accordance with the program. The computer can execute the processes in accordance with the program every time when the computer receives the program from the server computer.

In the above embodiment, a part of the structure realized by hardware can be replaced with software. Contrary to the above, a part of the structure realized by software can be replaced with hardware.

What is claimed is:

1. An image capturing apparatus comprising:

an imaging device;

a face region specifying unit that specifies a face region including an image of at least a part of a face in an image obtained by using the imaging device;

a face region brightness computing unit that computes a brightness level of the face region;

a background region brightness computing unit that computes a brightness level of a background region including at least a part of the image excluding the face region; and an image capturing control unit that determines an image capturing configuration in accordance with the brightness levels of the face region and the background region and performs an image capturing process in accordance with the determined image capturing configuration, wherein the image capturing control unit performs an image capturing process with emission of light or without emission of light in accordance with the brightness level of at least the face region, and wherein the image capturing control unit decreases a degree of sensitivity or a degree of exposure when the brightness level of the face region is lower than a predetermined brightness level and the brightness level of the background region is higher than a predetermined brightness level, and increases the degree of sensitivity or the degree of exposure when the brightness level of the face region is lower than a predetermined brightness level and the brightness level of the background region is lower than a predetermined brightness level.

2. The image capturing apparatus according to claim 1, further comprising:

a correcting unit that corrects a captured image obtained by the image capturing control unit, wherein the control unit determines a correcting configuration in accordance with the brightness levels of the face region and the background region.

3. An image capturing apparatus comprising:

an imaging device;

a face region specifying unit that specifies a face region including an image of at least a part of a face in an image obtained by using the imaging device;

a face region brightness computing unit that computes a brightness level of the face region;

a background region brightness computing unit that computes a brightness level of a background region including at least a part of the image excluding the face region;

an image capturing control unit that determines an image capturing configuration in accordance with the brightness levels of the face region and the background region and performs an image capturing process in accordance with the determined image capturing configuration, wherein the image capturing control unit performs an image capturing process with emission of light or without emission of light in accordance with the brightness level of at least the face region; and a correcting unit that corrects a captured image obtained by the image capturing control unit, wherein the control unit determines a correcting configuration in accordance with the brightness levels of the face region and the background region, and wherein the correcting unit does not perform a noise removing process when the brightness level of the face region is lower than a predetermined brightness level and the brightness level of the background region is higher than a predetermined brightness level and performs the noise removing process when the brightness level of the face region is lower than a predetermined brightness level and the brightness level of the background region is lower than a predetermined brightness level.

4. The image capturing apparatus according to claim 1, wherein the face region specifying unit increases a brightness level of an image by a predetermined level, the image being obtained by using the imaging device, when the brightness level of the image is lower than a predetermined brightness level, and specifies the face region in the image of which the brightness level is increased.

5. The image capturing apparatus according to claim 1, wherein in a case where a plurality of face regions are specified, when a difference between a maximum intensity of an edge and a minimum intensity of an edge in the plurality of face regions is greater than a predetermined threshold, the face region brightness computing unit computes a brightness level of the face region whose edge intensity is greater than a predetermined edge intensity.

6. The image capturing apparatus according to claim 1, wherein in a case where a plurality of face regions are specified, when a difference between a maximum size and a minimum size of the plurality of face regions is greater than a predetermined threshold, the face region brightness computing unit computes a brightness level of the face region whose size is greater than a predetermined size.

7. The image capturing apparatus according to claim 1, wherein in a case where a plurality of face regions are specified, when a difference between a maximum size and a minimum size of the plurality of face regions is greater than a predetermined threshold and a difference between a maximum intensity of an edge and a minimum intensity of an edge in the plurality of face regions is greater than a predetermined threshold, the face region brightness computing unit computes a brightness level of the face region whose size is greater than a predetermined size and whose edge intensity is greater than a predetermined edge intensity.

8. An image capturing apparatus comprising:

an imaging device;

a face region specifying unit that specifies a face region including an image of at least a part of a face in an image obtained by using the imaging device;

a face region brightness computing unit that computes a brightness level of the face region;

a background region brightness computing unit that computes a brightness level of a background region including at least a part of the image excluding the face region;

an image capturing control unit that determines an image capturing configuration in accordance with the brightness levels of the face region and the background region and performs an image capturing process in accordance with the determined image capturing configuration, wherein the image capturing control unit performs an image capturing process with emission of light or without emission of light in accordance with the brightness level of at least the face region; and a distance computing unit that computes a distance to an object by using a size of the face region, wherein the image capturing control unit performs an image capturing process with emission of light when the brightness level of the face region is lower than a predetermined brightness level and the distance to the object is shorter than a distance that the emitted light can reach and performs an image capturing process without emission of light by presenting a message indicating that the image capturing process with emission of light is not to be performed when the brightness level of the face region is lower than a predetermined brightness level and the distance to the object is greater than the distance that the emitted light can reach.

9. The image capturing apparatus according to claim 8, wherein when the brightness level of the face region is higher than a predetermined brightness level and the distance to the object is greater than the distance that the emitted light can reach, the image capturing control unit increases a sensitivity for capturing an image and performs the image capturing process without emission of light.

10. The image capturing apparatus according to claim 8, wherein in a case where the plurality of face regions are specified, when a difference between a maximum intensity of an edge and a minimum intensity of an edge in the plurality of face regions is greater than a predetermined threshold, the face region brightness computing unit computes a brightness level of the face region whose edge intensity is greater than a predetermined edge intensity, and the distance computing unit computes the distance to the object by using the size of the face region whose edge intensity is greater than a predetermined intensity.

11. The image capturing apparatus according to claim 8, wherein in a case where the plurality of face regions are specified, when a difference between a maximum size and a minimum size of the plurality of face regions is greater than a predetermined threshold, the face region brightness computing unit computes a brightness level of the face region whose size is greater than a predetermined size, and the distance computing unit computes the distance to the object by using the size of the face region whose size is greater than a predetermined size.

12. The image capturing apparatus according to claim 8, wherein in a case where the plurality of face regions are specified, when a difference between a maximum size and a minimum size of the plurality of face regions is greater than a predetermined threshold and a difference between a maximum intensity of an edge and a minimum intensity of an edge in the plurality of face regions is greater than a predetermined threshold, the face region brightness computing unit computes a brightness level of the face region whose size is greater than a predetermined size and whose edge intensity is greater than a predetermined edge intensity, and the distance computing unit computes the distance to the object by using the size of the face region whose size is greater than a predetermined size and whose edge intensity is greater than a predetermined edge intensity.

13. The image capturing apparatus according to claim 8, further comprising:

a correcting unit that corrects a captured image obtained by the image capturing control unit, wherein the control unit determines a correcting configuration in accordance with the brightness levels of the face region and the background region.

14. The image capturing apparatus according to claim 3, wherein the face region specifying unit increases a brightness level of an image by a predetermined level, the image being obtained by using the imaging device, when the brightness level of the image is lower than a predetermined brightness level, and specifies the face region in the image of which the brightness level is increased.

15. The image capturing apparatus according to claim 8, wherein the face region specifying unit increases a brightness level of an image by a predetermined level, the image being obtained by using the imaging device, when the brightness level of the image is lower than a predetermined brightness level, and specifies the face region in the image of which the brightness level is increased.

* * * * *